United States Patent Office 3,365,422
Patented Jan. 23, 1968

3,365,422
FORMATION OF POLYARYLENE ETHERS IN THE PRESENCE OF AN ONIUM COMPOUND
Hein M. Van Dort, Ede, Netherlands, assignor to N.V. Polychemie Aku-GE, Arnhem, Netherlands, a corporation of Netherlands
No Drawing. Filed Apr. 19, 1966, Ser. No. 543,534
Claims priority, application Netherlands, June 11, 1965, 65—7,455; Dec. 25, 1965, 65—16,934
8 Claims. (Cl. 260—47)

ABSTRACT OF THE DISCLOSURE

A process for the formation of polyarylene ethers of high molecular weight comprising the oxidation of a monovalent phenol in the present of an onium compound.

---

This invention relates to a process for the formation of polyarylene ethers of high molecular weight by the oxidation of monovalent phenols with oxygen or a compound that liberates oxygen under the reaction conditions. More particularly, this invention relates to a process for the formation of polyarylene ethers of high molecular weight by oxidizing a monovalent phenol in the presence of an onium compound.

The polyarylene ethers are a body of thermoplastics having a unique combination of chemical, physical and electrical properties over a broad temperature range. Processes for their formation are disclosed in U.S. patent applications Serial Nos. 372,375, 439,449; British patent Specification 930,993; and Netherlands patent applications Numbers 295,748, 295,699, 285,018, 64—3,375, 64—12,572, 65—3,568, and 65—4,925, the contents of which are incorporated herein by reference.

For most commercial applications, it is desirable to employ high molecular weight polyarylene ethers. In accordance with the present invention, it has been unexpectedly found that higher molecular weight polymers are obtained when monovalent phenols are oxidized in the presence of an onium compound.

Accordingly, an object of the present invention is to provide a process for the formation of high molecular weight polyarylene ethers which comprises the oxidization of monovalent phenols in the presence of an onium compound.

Other objects and advantages of this invention will be in part apparent and in part pointed out in the description which follows.

Briefly stated, the objects and advantages of this invention are achieved by the oxidative polymerization of monovalent phenols in the presence of from 0.1 to 10 mole percent of an onium compound calculated on the quantity of phenol to be oxidized under water-free conditions.

By water-free conditions, it is meant that a separate water phase will not be present in the reaction medium. There are, however, no objections to the reaction medium containing dissolved water in the solvent. In fact, dissolved water will probably always be present due to the formation of water during the reaction. The only limitation is that the water must be prevented from forming a separate phase during the reaction as this tends to retard or prevent the reaction from taking place.

The expression "onium compound" is meant to include those compounds corresponding to the following general formula: $R_nXY$ wherein X is a member selected from the group consisting of nitrogen, phosphorus, arsenic, antimony, oxygen, sulphur, selenium, tin, and iodine;

R is a member selected from the group consisting of hydrogen, and hydrocarbon;

Y is a monovalent anion or an equivalent portion of a polyvalent anion; and $n$ is a whole number equal to the valence of X plus 1.

Best results are obtained, according to the invention, if the onium compound employed is soluble in the reaction medium. Preferred onium compounds are tetra-alkyl-ammonium halides such as trimethyl-hexadecyl-ammonium bromide and triethylbenzyl-ammonium chloride. Other onium compounds which give favorable results are phosphonium compounds such as tetraphenylphosphonium chloride and sulphonium compounds such as triphenylsulphonium chloride. Included within the scope of the onium compounds are compounds with other anions such as iodides, hydroxides etc.

As noted above, the onium compound should be used in an amount ranging between 0.1 to 10 mole percent of the phenol to be oxidized. If the quantity of onium compound used is less than 0.1 mole percent, the effect produced is neglibly small. An amount in excess of 10 mole percent is not desirable as no additional advantages are realized and in some cases, the reaction speed is decreased.

The process of the present invention may be employed with any of the oxidative polymerization reactions of monovalent phenols disclosed in the above noted patent applications. In general, the preferred processes are those using air as an oxidizing agent and, for example, a copper amine complex as catalyst. Another desirable process makes use of lead dioxide or silver oxide as oxidizing agents.

The monovalent phenols which may be oxidized to high molecular weight polymers according to the present invention, are those enumerated in the aforementioned patent specifications and applications. Examples of suitable phenols include, but are not limited to, 2,6-disubstituted phenols such as: 2,6-dimethylphenol; 2,6-diethylphenol; 2,6 - dipropylphenol; 2,6 - dibutylphenol; 2,6-dilaurylphenol; 2,6 - diphenylphenol; 2,6-dibenzylphenol; 2,6-ditolylphenol; etc., phenols of which the substituents in the two ortho positions are different hydrocarbon radicals such as: 2-methyl-6-ethylphenol; 2,methyl-6-phenylphenol; etc., phenols which have hydrocarbon radicals in one or both meta positions, such as, for example: 2,3,6-trimethylphenol; 2,3,5,6-tetramethylphenol; etc., phenols having a halogen substituent on the phenylene radical such as, for example: 2-methyl-6-bromophenol; 2,3,5-trimethyl-6-chlorophenol; 2,6-dimethyl-3-chlorophenol, 2,6-dimethyl-3-chloro-5-bromophenol; etc., phenols whose substituents have a halogen atom, such as, for example: 2,6 - di-(chloroethyl)-phenol; 2,6-di-(chloropropyl)-phenol; etc., phenols of which one or both substituents are linked to the nucleus with an oxygen atom, for example: 2,6 - dimethoxyphenol, 2 - methoxy-6-ethoxyphenol, 2,6-diethoxy-phenol, and 2-ethyl-6-stearoxyphenol. Also, included within the scope of this invention are the unsubstituted phenols and 3,5-disubstituted phenols. In addition, mixtures of phenols are included so that the product is a copolymer.

In general, the preferred phenols are 2,6-dimethylphenol and 2,6-diphenylphenol as the polymers formed from these phenols have highly favorable properties.

The polyarylene ethers prepared according to the process of the present invention may be used in all those fields which have already been proposed for these compounds, such as in electrical engineering, as extrusion and injection molding material and as a starting material for fibers and films.

The following examples are set forth merely for purposes of illustration and not for purposes of limitation.

Examples 1 to 9

In all of these examples, 10 parts by weight 2,6-dimethylphenol are added to 90 parts by weight toluene and, with stirring, contacted with lead dioxide at 23° C. In most examples, an onium compound is added to the reaction mixture. The resulting polymers are isolated by filtering the reaction mixture and subsequently mixing it with methanol to precipitate the polymer. The resulting polymer is filtered off, washed with methanol and dried. The relative viscosity of the polymer is measured on a 1% by weight solution in benzene at 30° C. Processing conditions, yields, onium compounds and relative viscosities of the polymers obtained are listed in the table below. In the table, the mole percentage of the "further additives" are calculated on the basis of 2,6-dimethylphenol.

TABLE I

| Ex. | Amount of PbO$_2$ | Further additive | | Reaction time (min.) | Polymer yield, percent | $\mu_{rel}$ |
|---|---|---|---|---|---|---|
| | | Mole percent | Compound | | | |
| 1 | 48 | | | 60 | 84 | 1.80 |
| 2 | 48 | 1 | TMCAB [1] | 60 | 90 | 5.15 |
| 3 | 48 | 2 | TMCAB | 60 | 87 | 4.32 |
| 4 | 48 | 10 | TMCAB | 60 | | |
| 5 | 48 | | | 150 | 75 | 1.70 |
| 6 | 40 | 1 | TPC [2] | 150 | 75 | 2.02 |
| 7 | 40 | 1 | TSC [3] | 30 | 85 | 4.77 |
| 8 | 40 | 1 | TAC [4] | 30 | 88 | 5.98 |
| 9 | 40 | 10 | NH$_4$Cl | 40 | 80 | 2.30 |

[1] Tetramethylcetylammonium bromide.
[2] Tetraphenylphosphonium chloride.
[3] Triphenylsulphonium chloride.
[4] Tetraphenylarsonium chloride.

From the above table, it is apparent that the presence of an onium compound, even in a small amount, leads to the formation of polymers having a viscosity which is much higher than that obtained when the oxidative polymerization reaction is carried out in the absence of an onium compound. Example 9 is set forth to show that an inorganic onium compound, such as ammonium chloride must be used in considerably larger amounts than the other organic onium compounds to result in a high molecular weight polymer. The reason for this is that the ammonium chloride is not soluble in the reaction medium and the only reaction which can take place is on the surface of the solid particles. However, by employing a medium in which ammonium chloride is soluble, a considerably smaller amount would be required.

Examples 10 to 13

In all of these examples, 10 parts by weight 2,6-dimethylphenol were added to 90 parts by weight benzene. The phenol was polymerized by adding 1 mole percent cuprobromide (calculated on the basis of dimethylphenol) and 10 mole percent diethylamine. Trimethylcetylammonium bromide (TMCAB) was used as the onium compound. Air was passed through the mixture for 45 minutes while the temperature of the reaction mixture was maintained at 30° C. During the course of the reaction, the reaction vessel was constantly stirred. Relative viscosity was again measured as an indication of molecular weight. The following results were obtained:

TABLE II

| Example | TMCAB, mole percent | Yield, percent | $\mu_{rel}$ |
|---|---|---|---|
| 10 | | 85 | 2.13 |
| 11 | 0.5 | 87 | 2.61 |
| 12 | 1 | 85 | 2.97 |
| 13 | 2 | 81 | 2.45 |

Again, it can be seen that the addition of an onium compound to the reaction mixture results in higher molecular weight polymers as indicated by the increasing relative viscosity of the samples obtained.

Examples 14 and 15

The procedure of Examples 10–13 was repeated, however, 4 mole percent of triethylamine was used rather than 10 mole percent. In Example 14, the reaction was performed in the absence of an onium compound. In Example 15, 1 mole percent of the trimethylcetylammonium bromide was used. The relative viscosity of the polymer produced without the onium compound was 1.36, while that using 1 mole percent of the onium compound was 1.96.

Example 16

In this example, 10 parts by weight 2,6-dimethylphenol were dissolved in 90 parts by weight toluene. Thereafter, 0.3 part trimethylcetylammonium bromide was added to the solution, followed by the addition of 22 parts manganese oxide (based on phenol) to the reaction mixture, with stirring, over a period of about 5 minutes to maintain the temperature of the reaction at approximately 25° C. The reaction was allowed to proceed for 70 hours following the addition of manganese oxide. It should be noted however, that this time is not the time required to reach the resultant viscosity of the polymer. The polymer so formed, was precipitated by adding methanol in amounts twice as large as that of the polymer solution. The polymer was precipitated, filtered and dried in vacuum at 80° C. Relative viscosity was determined with a 1% by weight polymer solution in benzene at 30° C. The polymer was found to have a relative viscosity of 1.75. A second polymer was formed under the same conditions, but the trimethylcetylammonium bromide was omitted. This polymer had a relative viscosity of 1.23. Again, it can be seen that the addition of an onium compound to the reaction mixture causes an increase in molecular weight as indicated by the relative viscosity of the material.

Although the invention has been illustrated by the preceding examples, the invention is not to be construed as limited to materials employed in the above examples, but rather, the invention encompasses the generic concept as hereinbefore disclosed. Various modifications and embodiments of this invention can be made without departing from the spirit and scope thereof.

What I claim as new and desire to secure by Letters Patent of the United States is:

1. In a process for the formation of polyphenylene ethers by oxidatively polymerizing a monovalent phenol in the absence of free water with a material selected from the group consisting of oxygen and a compound capable of liberating oxygen under reaction conditions, the improvement which comprises performing the oxidative polymerization reaction in the presence of at least 0.1 mole percent of an onium compound calculated on the basis of the phenol oxidized.

2. The process of claim 1 wherein the onium compound is soluble in the reaction medium.

3. The process of claim 1 wherein the oxidative polymerization reaction uses oxygen in the presence of a copper salt-amine complex catalyst.

4. The process of claim 1 wherein the oxidative polymerization reaction uses a material capable of liberating oxygen under reaction conditions.

5. The process of claim 4 wherein the oxidative polymerization reaction uses manganese oxide as the material capable of liberating oxygen under reaction conditions.

6. The process of claim 1 wherein the onium compound is tetramethylcetylammonium bromide.

7. The process of claim 1 wherein the onium compound is tetraphenylphosphonium chloride.

8. The process of claim 1 wherein the onium compound is triphenylsulphonium chloride.

No references cited.

WILLIAM H. SHORT, *Primary Examiner.*

M. GOLDSTEIN, *Assistant Examiner.*